(12) United States Patent
Dellapina

(10) Patent No.: US 7,810,924 B2
(45) Date of Patent: Oct. 12, 2010

(54) EYEGLASS FRAMES FOR PEOPLE WITH SPECIAL NEEDS

(76) Inventor: Maria L. Dellapina, 235 Troy Oaks Dr., Hiram, OH (US) 44234

( * ) Notice: Subject to any disclaimer, the term of this patent is extended or adjusted under 35 U.S.C. 154(b) by 7 days.

(21) Appl. No.: 12/386,134

(22) Filed: Apr. 14, 2009

(65) Prior Publication Data

US 2009/0310080 A1    Dec. 17, 2009

Related U.S. Application Data

(60) Provisional application No. 61/123,892, filed on Apr. 14, 2008.

(51) Int. Cl.
G02C 5/02 (2006.01)

(52) U.S. Cl. .................... 351/41; 351/111; 351/124; 351/137

(58) Field of Classification Search ............. 351/41, 351/44, 54, 55, 83, 84, 88, 111, 124, 136–137, 351/178

See application file for complete search history.

(56) References Cited

U.S. PATENT DOCUMENTS

| | | | |
|---|---|---|---|
| D84,024 S | 12/1930 | Bosworth | |
| 1,945,617 A | 2/1934 | Nelson | |
| 1,970,429 A | 8/1934 | Nerney | |
| 1,986,089 A | 1/1935 | Wingate | |
| D153,955 S | 5/1949 | Lauber | |
| D227,164 S | 6/1973 | Shindler | |
| D274,534 S | 7/1984 | Kanoui | |
| 4,762,407 A * | 8/1988 | Anger et al. | 351/204 |
| D312,648 S | 12/1990 | Baba | |
| D327,716 S | 7/1992 | Conway | |
| D386,513 S | 11/1997 | Conway | |
| D389,505 S | 1/1998 | Conway | |
| D392,667 S | 3/1998 | Hyoui | |
| D403,008 S | 12/1998 | Hyoui | |
| D426,257 S | 6/2000 | Hirschman et al. | |
| D473,258 S | 4/2003 | Hirschman | |
| D552,153 S | 10/2007 | Miklitarian | |
| D556,819 S | 12/2007 | Fuchs | |
| D563,454 S | 3/2008 | Miklitarian | |
| D573,170 S | 7/2008 | Fuchs | |
| 2007/0040987 A1 | 2/2007 | Liang | |
| 2007/0132946 A1 * | 6/2007 | Krefman | 351/159 |

* cited by examiner

*Primary Examiner*—Huy K Mai
(74) *Attorney, Agent, or Firm*—D. Peter Hochberg; Sean F. Mellino; Daniel J. Smola

(57) ABSTRACT

Eyeglass frames for people with Down syndrome, for others having facial characteristics similar to those with Down syndrome, and those with a depressed nasal bridge or a low nasal bridge, the eyeglass frames having a bridge lower than the normal higher placed bridge and in general alignment with the optical center of lenses mounted in the lens frames, extensions to widen the temple distance to accommodate the broader temples of people having Down syndrome or facial characteristics similar to those with Down syndrome, lower temples to maintain the general alignment of the location of the optical center with the pupils of the person wearing the eyeglass frames; and shorter temples than temples for normal caucasians to accommodate the ears as located on persons with normal facial features.

10 Claims, 4 Drawing Sheets

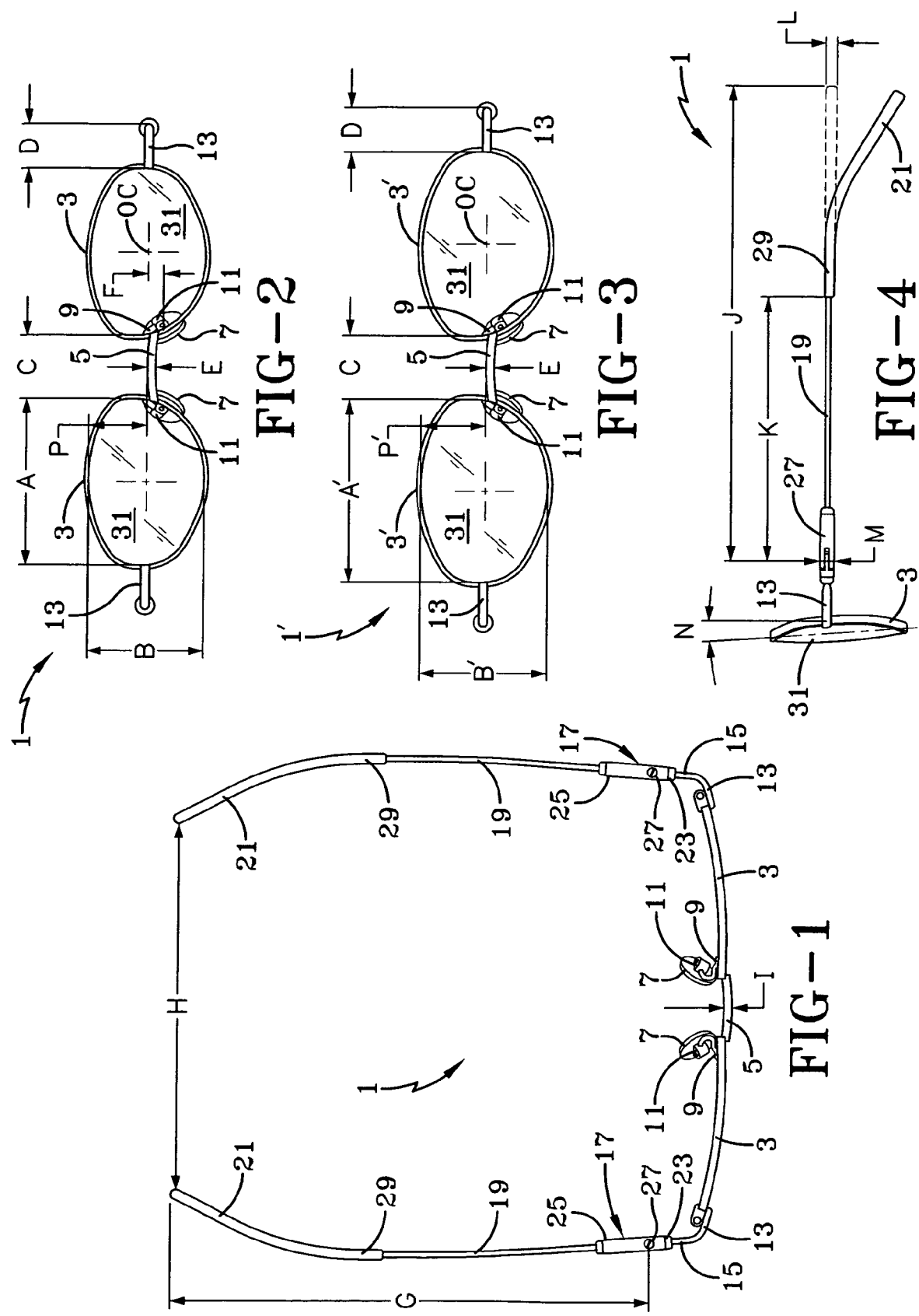

EYEGLASS FRAMES FOR PEOPLE WITH SPECIAL NEEDS

CROSS-REFERENCE TO RELATED APPLICATION

This application claims the benefit of U.S. Provisional Application 61/123,892 filed. Apr. 14, 2008.

BACKGROUND OF THE INVENTION

1. Field of the Invention

This invention relates to eyeglass frames and more specifically to eyeglass frames for people with special needs such as those people with Down syndrome.

2. Description of the Prior Art

Down syndrome is a common medical syndrome of fairly wide occurrence. Down syndrome occurs in approximately 1 in 600-650 live births. It is usually caused by a genetic aberration that is hereditary. People with Down syndrome have some distinctive facial and physical characteristics. These include a posteriorly flattened skull, a flat nose which is further below the eyes than a person without Down syndrome, a depressed nasal bridge and low-set ears. There have heretofore been no eyeglass frames made specifically for people with Down syndrome according to research which has been done on this topic, and likewise no eyeglass frames for people with similar facial characteristics and for those with a depressed nasal bridge or low set noses including those individuals of African descent and Asian descent. About 87% of children with Down syndrome require glasses. Prior to the present invention, children and adults having Down syndrome have been fitted with ordinary eyeglass frames. Since the child or adult with Down syndrome has a flat nose with a depressed nasal bridge, and low-set ears, the eyeglass frames fit lower on the person's face than they would for a person without Down syndrome. The result is that a person with Down syndrome looks through the upper portion of the glasses, and since the eyes are closer together than for a person without Down syndrome (i.e., they have a narrower pupillary distance or "PD"), they are moved closer together, wherefore the person looks through the glasses in an off center manner, making the lenses in the eyeglass frames less effective than they should be. The problem is compounded because people with Down syndrome are generally unable to realize that the eyeglass frames are incorrectly worn.

There are numerous patents that have issue on various types of eyeglass frames which may appear to incorporate some of the features of the present invention, but none of them were prepared for children and adults with Down syndrome or other defects affecting the location of their eyes (more particularly, to the narrow distance (interpupillary distance) between the pupils of the eyes), the position and flatness of the nose, the wideness of the person's face between temples or temple distance compared to the eyes and the low-set ears, as compared to a normal person. Many of these patents are design patents, such as DES. 84,024 (Bosworth, 1931), DES. 153,955 (Lauber, 1949), DES. 327,716 (Conway, 1992), DES. 392,667 (Hyoui, 1998), DES. 403,008 (Hyoui, 1998), U.S. D473,258 (Hirschman, 2003), U.S. D552,153 (Miklitarian, 2007) and U.S. D563,454 (Militarian, 2008), and a utility patent such as U.S. Pat. No. 1,970,429 (Nerney, 1930), and a patent publication such as U.S. 2007/0040987 (Liang, 2007).

As noted above, despite the large number of babies born with Down syndrome, estimated to be approximately 1 in 600-650 live births, and approximately 480,000 people with Down syndrome living in Europe and North America. Although there are about 225,000 babies with Down syndrome born every year throughout the world, eyeglass frames have never been developed for people with Down syndrome and other defects having the facial characteristics of people with Down syndrome. There are also numerous people of African and Asian descent whose eyeglass frames sit low on their face, and their pupils are aligned with locations above the optical center of the lenses in eyeglass frames.

The optical center of an eyeglass lens should be aligned with the pupil of the eye looking through the lens. The optical center is one of the intersection points of the optical center of the lens surface. Each curved surface of a lens is made as a portion of a spherical surface. The center of the sphere is called a center of curvature of the surface; every point on the surface is equidistant to it, this distance being the radius of curvature. The line joining the two centers of curvature also passes through the optical center of the lens and is called the principal axis.

The present invention provides eyeglass frames for people, especially children, with Down syndrome which properly fit so the child or adult looks through the optical center of the respective lenses. This is accomplished by lowering the bridge so that it contacts the nose of the person with Down syndrome, extending and lowering the temple placement of the glasses, and shortening the temple or arm length, all of which cooperate to locate the lens on the child or adult wearing the eyeglass frames so that the pupil views through the optical center of the respective lenses mounted in the frame.

SUMMARY OF THE INVENTION

It is an object of the present invention to provide eyeglass frames for children and adults having facial characteristics of those with Down syndrome.

Another object of the present invention is to provide eyeglass frames for children and adults having Down syndrome and for people with facial characteristics similar to those with Down syndrome, which are positioned on the person's face so that the person looks through the optical center of the respective lenses.

It is yet another object of the present invention to provide eyeglass frames for children and adults having Down syndrome or facial characteristics similar to those having Down syndrome where the eyeglass frames engage the person's nose, the inventive eyeglass frames having a wide temple distance and being at the same level as the bridge with respect to the frames for positioning the eyeglass frames so as to align the pupils of the person wearing the eyeglass frames with the location of the optical center of the lenses when they are mounted in the frame.

Still another object of the invention is to provide eyeglass frames for people having Down syndrome or facial characteristics similar to those with Down syndrome, the frames having shorter temples (also referred to as temple pieces or arms) which are shorter than ordinary glasses due to the location of the person's ears which are relatively close to the face when compared with normal glasses.

It is yet another object of the present invention to provide eyeglass frames for persons having Down syndrome or facial characteristics similar to those with Down syndrome, the eyeglass frames having end pieces with spring hinges to enable the frame temples to be able to swing inwardly and outwardly away from the lenses for making it easier to both fold the eyeglass frames for storage and to put on and take off the eyeglass frames from a person.

Another object of the present invention is to provide eyeglass frames for persons with Down syndrome or facial characteristics similar to those with Down syndrome having a bridge which is in alignment with the optical center of the lenses, and having nose pads for enabling the person to wear the glasses with a bridge properly positioned.

It is another object of the present invention to provide eyeglass frames for people with Down syndrome or facial characteristics similar to those with Down syndrome which do not slip down the person's nose who is wearing the glasses.

It is still a further object of the present invention to provide eyeglass frames for Asians, person of Asian descent, Africans and persons of African descent, and other people having a depressed nasal bridge as compared to Caucasian people, and eyeglass frames for the foregoing groups of people which do not slip down the person's nose, which eyeglass frames are positioned when worn to align the pupils of the eyes with the optical center of the respective lenses.

A general object of the present invention is to provide eyeglass frames for people having Down syndrome, facial features similar to those of persons with Down syndrome and persons with a depressed nasal bridge, which hold the eyeglass frames in place on the person wearing them so that the eye pupils are aligned with the optical center of the lenses mounted in the frames, and which are economical to manufacture and effective in use.

These and other objects will be apparent to those skilled in the art to which the invention pertains, from the description to follow and from the appended claims.

BRIEF DESCRIPTION OF THE DRAWINGS

FIG. 1 is a top plan view of an eyeglass frame according to the invention.

FIG. 2 is a front view of the eyeglass frame shown in FIG. 1.

FIG. 3 is a front view of a similar eyeglass frame having larger lenses than those shown in FIG. 2.

FIG. 4 is a side view of the eyeglass frame shown in FIG. 1.

DETAILED DESCRIPTION OF THE PREFERRED EMBODIMENT

Figure 5:
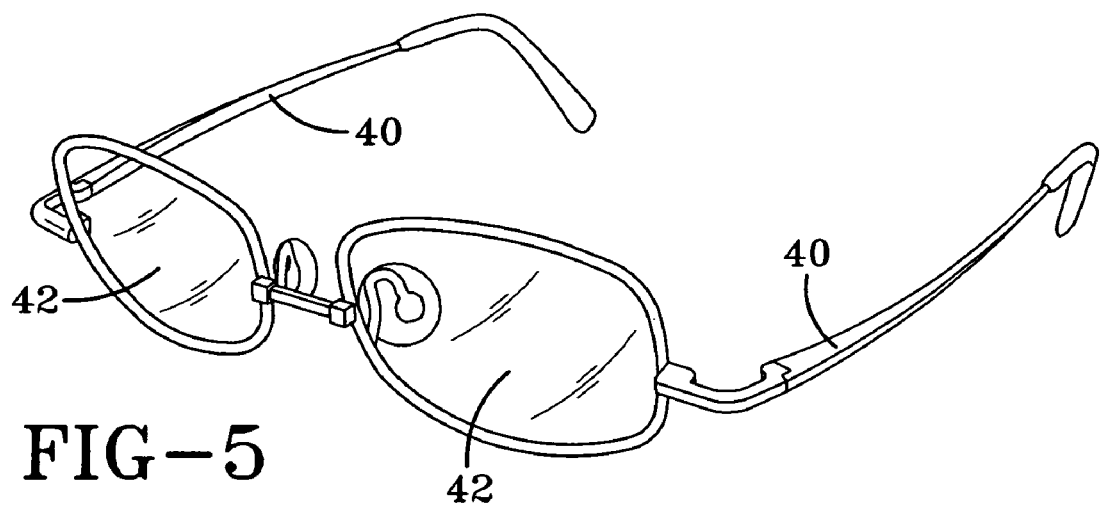
FIGS. 5-10 are perspective views of other styles of eyeglass frame according to the invention.
Figure 6:
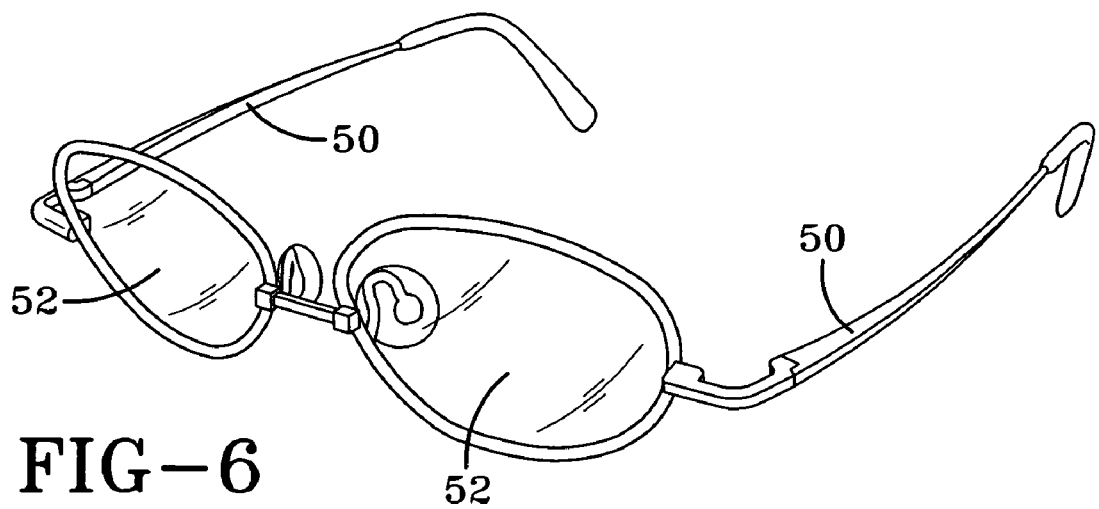

As explained above, the present invention is directed to eyeglass frames for people with Down syndrome or facial characteristics similar to those with Down syndrome. It is also for use for people with a depressed nasal bridge such as persons from African descent and Asian descent, where conventional eyeglass frames are constructed with the bridge being relatively high with respect to the lens frames which they connect, causing the wearer's pupils to be located above the optical center of the lenses so that the wearer's line of vision is near the top of the lenses, causing distortion. The invention essentially moves the bridge lower relative to the lens frames than conventional bridges using conventional bridge frames. The temples are shorter than those of normal glasses to accommodate the location of the person's ears, which are closer to the face than they are for most Caucasian people. Furthermore, extensions are provided to accommodate the wider temple width of persons with Down syndrome, and the temples extend backwardly over the ear, and are coplanar with the bridge to keep the pupil of the wearer in alignment with the respective optical center of the lenses. A 180° hinge is preferably provided for connecting the respective temples to the respective extension, and the hinge is swingable over a 180° arc making it easy for the glasses to be put on and removed.

Turning first to FIG. 1, a top plan view of an eyeglass frame 1 is shown. Two front views are shown, a first variation of frame 1 is shown in FIG. 2 having relatively small lens frames, and a second front view for eyeglass frames 1' is shown in FIG. 3. The numbers for parts different in FIG. 3 are identified by the same numbers as in FIGS. 1, 2 and 4, except with the (') prime used. FIG. 4 is a side view of frame 1 shown in FIG. 1. FIG. 4 is considered to be the side view of both frame 1 and frame 1'.

Each eyeglass frame 1 and 1' is composed of a pair of lens frames 3 and 3' which are connected together by a bridge 5, the latter being the same for frames 1 and 1'. A pair of nose pads 7 are attached to lens frames 3 and 3' by means of mounting arms 9 which are soldered or otherwise attached to lens frames 3 and 3', respectively. Nose pads 7 are preferably made of soft plastic and are attached to a hinge arm 11 for enabling some pivoting of nose pads 7 so that they rest comfortably on the nose of the wearer of the eyeglass frame with mounted lenses. Since people with Down syndrome have a broader temple width than do people without Down syndrome, the front width or temple width, discussed in further detail below, is made wider by a pair of extensions 13. Extensions 13 are integral with a rearward extension 15, to each of which is attached a hinge assembly 17. Hinge assemblies 17 are used to connect a pair of temples 19 to lens frames 3 via extensions 13. Temples 19 include at one end a hinge connection piece which may include part of hinge assembly 17 and an ear rest 21, which is often bent downward to loop over the ears of the wearer and inclined towards each other to assist in clasping the rear portion of the eyeglass frame to the head of the wearer. Each rearward extension 15 preferably includes a portion 23 of hinge assembly 17, and temple 19 preferably includes a rearward portion 25 of hinge assembly 17. Rearward extension 15 and hinge assembly 17 are preferably coupled to a hinge assembly 27 which enables temples 19 to be bent 180° so that the temples can be folded inwardly, towards each other, to fold into a collapsed condition when the glasses are to be put into storage such as a storage case, in a wearer's pocket, or in some other location when they are not being used. Temples 19 can also be bent outwardly around 90° from their operating condition to make it easier for eyeglass frame 1 (or 1') to be put on the wearer or removed from the wearer. Ear rests 21 preferably includes a plastic covering 29 which prevents irritation to the ears of the wearer by uncovered temples 19, and enables a closer fit of ear rests 21 between the ears of the wearer and the wearer's head.

There are a number of important dimensions used with eyeglass frames, some of which are particularly important with respect to the present invention. The lens width or "eye size" is shown by the letter A. The lens height or "frame depth" is shown by the letter B. The length of bridge 5 is shown by the letter C. Eyeglass frame 1 is shown with a pair of lenses 31 mounted in lens frames 3, and each lens 31 has an optical center shown by the letters OC. The length of each extension 13 is shown by the letter D. The height of bridge 5 is shown by the letter E. Considering eyeglass frame 1' shown in FIG. 3, the lens height is shown by the letter B' and the lens width is shown by the letter A'. Referring to the view shown in FIG. 1, the temple length, is shown by the letter G, and the distance between the free ends of arm rests 21 is shown by the letter H. Referring to the side view of FIG. 4, the length of each temples 19 in their unbent position (shown in dotted line) is shown by the letter J, and the length of temples 19 from hinge assembly 27 to the beginning of plastic covering 29 of ear rest 21 is reflected by the letter K. The thickness of each temple 19 in its covered form is reflected by the letter L. The thickness of each hinge assembly 17 is shown by the letter M. The angle between temple 19 and the curve part of lens frame 3 shown by the angle N. Referring back to FIGS. 2 and 3, the bridge depth is shown by the letter P.

Figure 11:
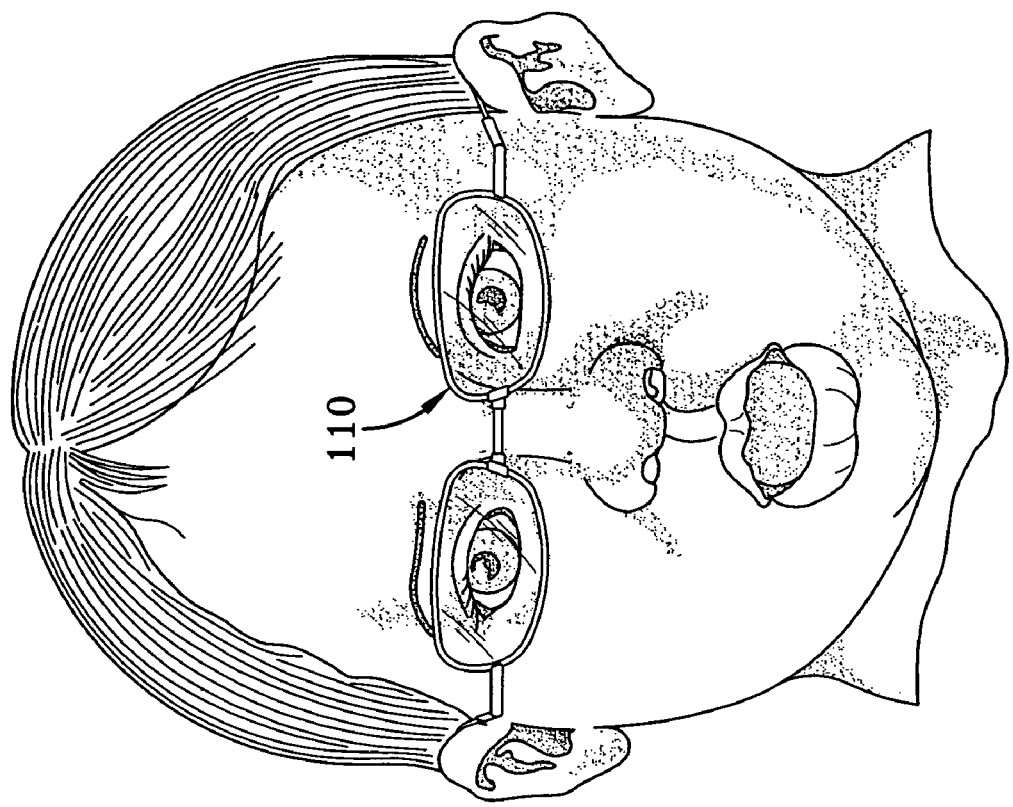
FIG. 11 is front view of a child having Down syndrome wearing the eyeglass frame according to the prior art.
Figure 12:
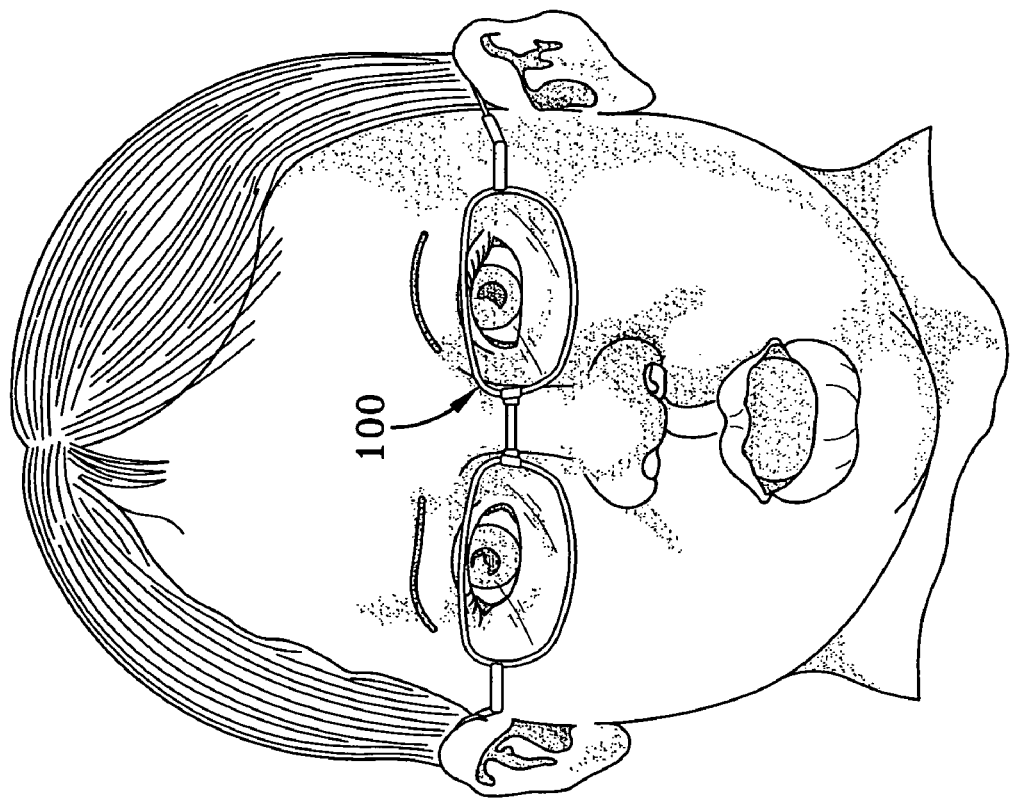
FIG. 12 is a view of a person with Down syndrome wearing an eyeglass frame according to the present invention

For eyeglass frames which are considered to be "normal," the bridge is positioned quite high with respective to the lens frames so that the bridge rests on the upper portion of the nose. In most Caucasian people, the summit or root of the nose is directly connected with the forehead. The root of the nose has the nasal bone, and it generally starts protruding from the face at a position between the eyes. Therefore, conventional glasses have the bridge for extending over the nasal bone so that the optical center of the lenses in the lens frames are in alignment with the pupils of the eyes of the wearer. However, in people with Down syndrome, the root of the nose is much lower on the person's face. Therefore, when a person with Down syndrome or similar facial characteristics wears conventional glasses, the lenses are disposed low on the person's face so the wearer's pupils are near the upper portion of the lenses, and in addition are disposed slightly inwardly from vertical projection of the optical center of the respective lenses. This is shown in FIG. 11. In the present invention, bridge 5 is disposed much lower than in eyeglasses for ordinary Caucasian people, and is shown in FIG. 2 as dimension P. Dimension P has been determined to be one half of lens height (B or B'), which is generally equal to the corresponding dimension to the optical center OC of each lens 31. Dimension P extends from the top of the lens frame 3 or 3', to the top of bridge 5. Nose pads 7 engage opposite sides of the nose to position bridge 5, with the result that the person having Down syndrome or a depressed upper portion of the nose will have their pupil in general alignment OC, as shown in FIG. 12.

One of the important dimensions for eyeglass frames for people with Down syndrome according to the invention is the location of bridge 5, because this is one of the dimensions which locates the optical center OC of lenses mounted in lens frames 3 with respect to the pupil of the eyes of the wearer. The dimension P has been found to be in general alignment with optical centers OC of the lenses in lens frames 3. The lens height or frame depth B as shown in FIG. 2. or B' as shown in FIG. 3, is useful in locating bridge 5, and the inventor has found it to be convenient to locate bridge 5 at a distance which is one half of B (or B') of lens frames 3. Thus, if B equals 25.8 mm, the distance P, equalling one half of B, is 12.9 mm. Likewise, if B' in FIG. 3 is equal to 28.5 mm, the dimension P' is 14.25 mm.

Another important dimension is the dimension G, the length of temples 19. This dimension is always shorter than it would be for "normal" eyeglass frames. The following is a chart showing preferred temple lengths G according to the invention:

| Lens Width (mm) A | Temple Length (mm) G |
| --- | --- |
| 35 | 105 |
| 38-46 | 110 |
| 48-52 | 120 |

As explained earlier, it is necessary to widen the front width or temple width of eyeglass frames 1 according to the invention. It has been found that the length D of extensions 13 as shown in both FIGS. 2 and 3 is preferably 10 mm. This enables the use of fairly standard lens widths A, the length C of bridge 5 to be 16 mm or 18 mm depending on eye size, with persons having an eye size of 46 mm or more (width B of eyeglass frame) having a bridge length of 18 mm, and obtain the width as required.

The following dimensions for eyeglass frames 1 (and 1') have been found to be effective in the present invention:

| Schematic Dimension | Numerical Dimension (mm) |
| --- | --- |
| A | 38 |
| B | 25.8 |
| B' | 28.5 |
| C | 16 or 18 |
| D | 10 |
| E | 1.6 |
| F | 1 |
| G | 105, 110 or 120 |
| H | 82.1 |
| I | 1.9 |
| J | 110 |
| K | 60 |
| L | 2.7 |
| M | 3 |
| N | 85° |
| P | 12.9 |
| P' | 14.25 |

The foregoing dimensions have been found to be very good for particular children having Down syndrome. Of course, these dimensions may change for different children and adults and for persons of African or Asian descent. Nevertheless, in each case, the location of bridge 5 is much lower than in normal glasses, and in general alignment with the optical center of the lenses mounted in the eyeglass frames. The location of the bridge is easily accomplished by taking one half of the lens height or B for proper location.

Figure 7:
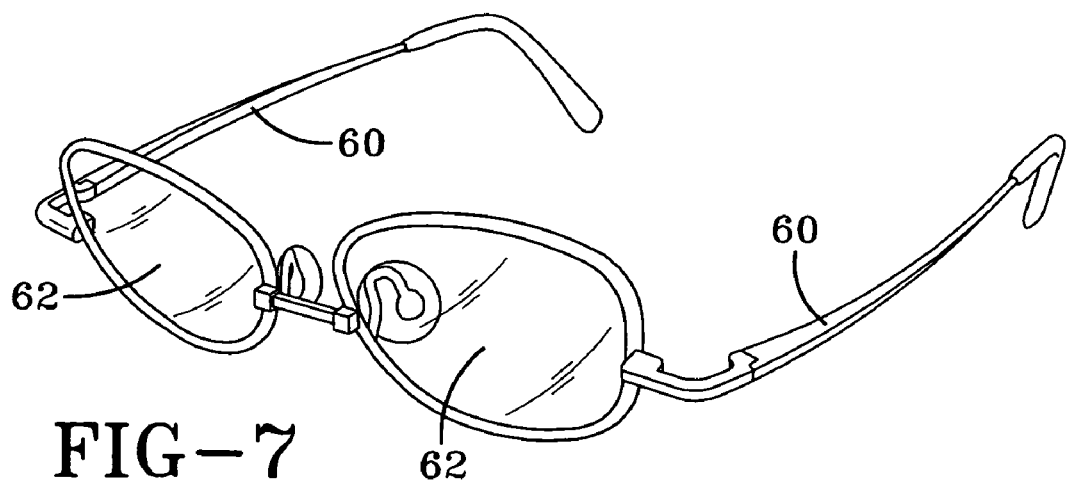

Eyeglass frames can be made to be quite stylish, to give the person wearing them a sense of pride. Eyeglass frames according to the invention of different styles are shown in FIGS. 5-10. In FIG. 5, eyeglass frames 40 are shown having lens frames 42 which can be described as having a generally rounded square configuration. In FIG. 5, eyeglass frame 50 is shown having lens frames 52, which are similar to those in FIG. 5, but have a more rounded shape, something in the form of an apple. Referring to FIG. 7, eyeglass frames 6 are shown, having lens frames 72 which are similar to those in FIG. 6, but have straighter sides.

Figure 8:
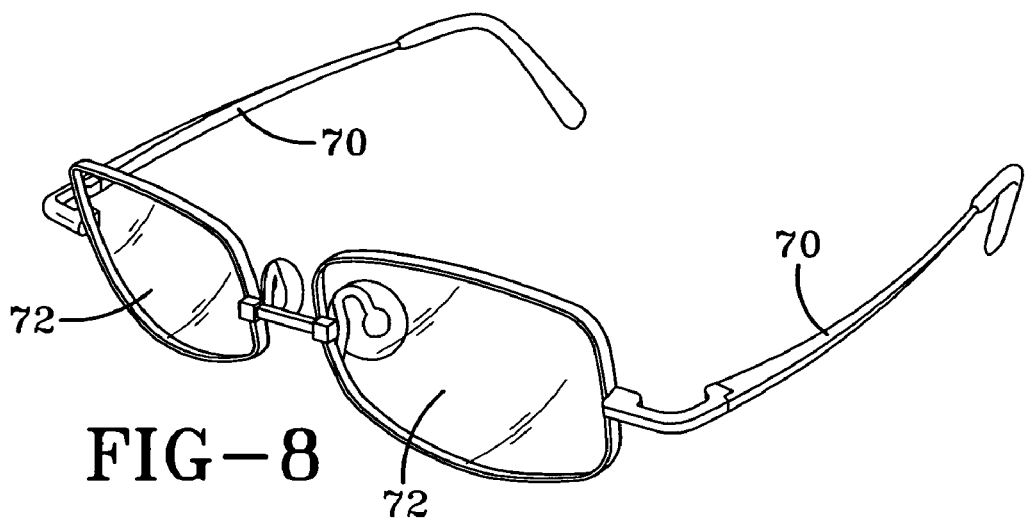
Figure 9:
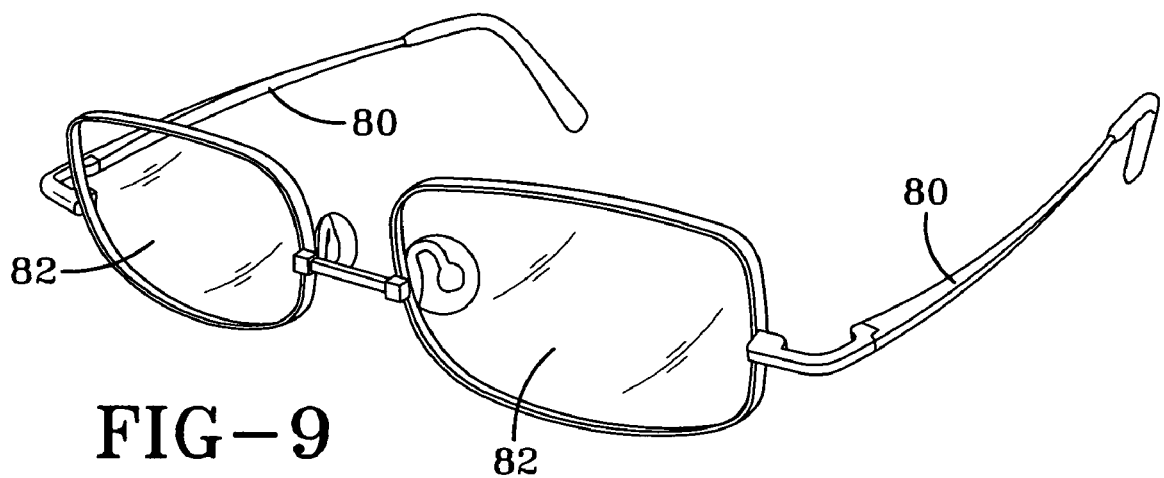
Figure 10:
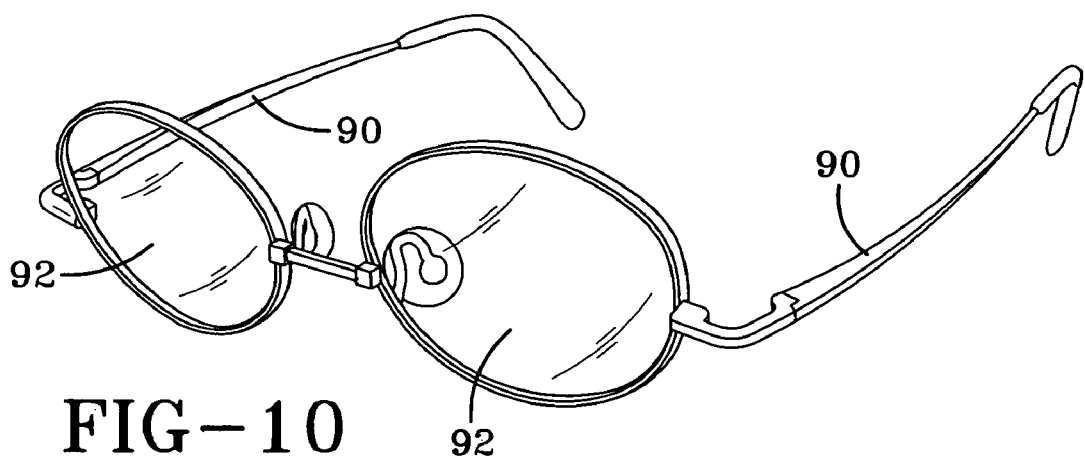

Turning next to FIG. 8, eyeglass frames 80 are shown having lens frames 82 which are similar to lens frames 52, but having top portions which are less rounded. In FIG. 9, eyeglass frames 90 are shown having lens frames 92. Lens frames 92 are also of a generally rounded square configuration, having a fairly flat top and flat sides, but a rounded base. Eyeglass frames 100 shown in FIG. 10 have lens frames 102 which are generally round in configuration.

As mentioned earlier, FIG. 3 shows a child with Down syndrome wearing eyeglass frames 100 according to the prior art. It can be seen that the pupils of the child's eyes are above the optical center of the lenses mounted in eyeglass frames 100, and slightly inward of the optical center. On the other hand, FIG. 12 shows a child with Down syndrome wearing eyeglasses 110 according to the present invention. The lower bridge and lower arms of eyeglass frames 110 position eyeglass frames 110 so that the pupils of the child's eyes are generally in alignment with the optical center of the lenses mounted in eyeglass frames 120. The extensions provided outside each of the lens frames provide a proper temple width so that the child can comfortably wear eyeglass frames 110.

As noted earlier, this invention is a major improvement in eyeglass frames for people with Down syndrome. There have never been glasses known to exist which are made for such children, which assures that the person's eye pupils are general aligned with the optical center of lenses mounted in the eyeglass frames. Such eyeglass frames also provide better location of lenses mounted in the eyeglass frames to persons having depressed nasal bridges, including those persons of African and Asian descent.

The glasses could be made of many different materials. Metals are a popular material for eyeglass frames. Some common materials are Monel, which can be hammered into many shapes without losing strength, and can be made in various colors. Aluminium is very light weight, but it is difficult to solder or weld, so its adaptability for different shapes is limited. High quality frames could be made with cobalt, but this is an expensive material. Phosphor bronze is good for temples because it is mostly made from copper and is therefore flexible. Stainless steel is corrosion-resistant, but it is difficult to work with in the manufacturing process. Nickel silver is useful for hinges, end pieces and heavy bridges and for the intercore temples. It is brittle and not of much use for popular slender frames. Plastics are also popular for use in glass frames according to the invention, and include cellulose acetate, polycarbonate and optyl. It is also possible to use composites in making eyeglass frames according to the invention, including carbon fiber graphite, copolyamide, Flexon7 and titaniumTi-227.

The invention has been described in detail with particular emphasis on the preferred embodiments of the invention, but variations and modifications may occur to those skilled in the art to which the invention pertains.

The invention claimed is:

1. Eyeglass frames for a pair of eyeglasses for people having Down syndrome, facial characteristics similar to those with Down syndrome or having a depressed nasal bridge, said eyeglass frames comprising:
   lens frames for holding a pair of lenses, the lenses having the optical center located at a particular place on the lenses;
   a bridge interconnecting said lens frames, the bridge being located below the location of a bridge for eyeglass frames used for normal caucasian people, said bridge being in general alignment with the location of the optical center of the lenses when the lenses are mounted in said lens frames;
   nose pads operatively connected to said lens frames for supporting the weight of said eyeglasses on the nose of the wearer of said eyeglasses and for positioning said bridge in general alignment with the location of the lenses when the optical center of the lenses are mounted in said lens frames; and
   temples extending rearwardly from said extensions for overlapping the wearer's ears, said temples being generally coplanar with said bridge for generally aligning the wearer's pupils with the optical center of the lenses when said lenses are mounted in said eyeglass frames.

2. Eyeglass frames according to claim 1 and further including:
   extensions extending outwardly from the respective lens frames to widen the temple width of the eyeglass frames beyond the normal dimensions for caucasian persons to generally equal the temple width of the wearer.

3. Eyeglass frames according to claim 1 wherein the temple length of the eyeglass frames is in the range of 105 mm to 120 mm, the range of the temple widths of children with Down syndrome.

4. Eyeglass frames according to claim 1 wherein the said bridge has a bridge length in the range of 16-18 mm, to accommodate the pupillary distance of people with Down syndrome, to generally align the wearer's respective pupils with the optical center of the lenses when the lenses are mounted in said eyeglass frames.

5. Eyeglass frames according to claim 1 wherein the bridge depth is one half of the lens height of the eyeglass frame.

6. Eyeglass frames according to claim 1 wherein the frame height is 25.8 mm.

7. Eyeglass frames according to claim 1 wherein the relationship between the lens width and the temple length is as follows:

| Lens Width (mm) | Temple Length (mm) |
| --- | --- |
| 35 | 105 |
| 38-46 | 110 |
| 48-52 | 120 |

8. Eyeglass frames according to claim 1 wherein the length of each extension is 10 mm.

9. Eyeglass frames according to claim 1 wherein hinges are provided at the ends of said extensions, for rotatively connecting said temples to said extensions, said hinges enabling the rotation of said temples by 180° in a plane generally including said bridge.

10. Eyeglass frames according to claim 1 wherein said temples are shorter in length than temples in comparable frames worn by normal caucasian persons.

* * * * *